United States Patent
Hamel et al.

(10) Patent No.: US 10,953,738 B2
(45) Date of Patent: Mar. 23, 2021

(54) ARRANGEMENT FOR A DRIVE MOUNTING

(71) Applicant: MAN Truck & Bus AG, Munich (DE)

(72) Inventors: Reinhard Hamel, Munich (DE); Ines Hestermann, Munich (DE); Christian Lang, Heiligenstadt (DE); Andreas Leisch, Munich (DE); Kolja Peter, Munich (DE); Patrick Schwedes, Munich (DE)

(73) Assignee: MAN Truck & Bus AG, Munich (DE)

( * ) Notice: Subject to any disclaimer, the term of this patent is extended or adjusted under 35 U.S.C. 154(b) by 0 days.

(21) Appl. No.: 16/298,442

(22) Filed: Mar. 11, 2019

(65) Prior Publication Data
US 2019/0275872 A1 Sep. 12, 2019

(30) Foreign Application Priority Data
Mar. 12, 2018 (DE) ...................... 10 2018 105 593.5

(51) Int. Cl.
*B60K 1/04* (2019.01)
*B60K 1/00* (2006.01)
(Continued)

(52) U.S. Cl.
CPC .................. *B60K 1/00* (2013.01); *B60K 5/12* (2013.01); *B60K 5/1208* (2013.01);
(Continued)

(58) Field of Classification Search
CPC .......... B60K 5/00; B60K 5/1216; B60K 5/12; B60K 1/00; B60K 5/1208; B60K 5/1225; F16F 15/08; F16F 13/02; F16F 1/36
See application file for complete search history.

(56) References Cited

U.S. PATENT DOCUMENTS 3,869,017 A * 3/1975 Feustel .................... B60K 5/00
                                                              180/232
4,362,221 A    12/1982 Manning
(Continued)

FOREIGN PATENT DOCUMENTS

DE    102010027592 A1    2/2011
DE    102009040896 A1    3/2011
(Continued)

OTHER PUBLICATIONS

German Search Report for related case DE 102018105593.5, dated Jan. 30, 2019.
(Continued)

*Primary Examiner* — John D Walters
*Assistant Examiner* — James J Triggs
(74) *Attorney, Agent, or Firm* — Maginot, Moore & Beck LLP

(57) ABSTRACT

The invention relates to an arrangement for the drive mounting, in particular for a motor vehicle, preferentially a utility vehicle. The arrangement comprises a supporting structure, in particular a cross member structure. The arrangement comprises an, in particular electric, drive unit, which is attached to the supporting structure in a 3-point mounting on an underside and/or from below. Advantageously, the drive unit can thus be fed to the motor vehicle from the rear end. The drive unit can be practically lifted in order to be then attached to the supporting structure on an underside or from below. The 3-point mounting makes possible a quick assembly. In addition, a static redundancy of the mounting through too many bearing points (e.g. four or more) is prevented.

19 Claims, 4 Drawing Sheets

(51) Int. Cl.
    *F16F 1/36*     (2006.01)
    *F16F 15/08*    (2006.01)
    *F16M 13/02*    (2006.01)
    *B60K 5/12*     (2006.01)

(52) U.S. Cl.
    CPC ......... *B60K 5/1216* (2013.01); *B60K 5/1225* (2013.01); *F16F 1/36* (2013.01); *F16F 15/08* (2013.01); *F16M 13/02* (2013.01)

(56) References Cited

U.S. PATENT DOCUMENTS

| | | | | |
|---|---|---|---|---|
| 5,967,251 | A * | 10/1999 | Turl | B60K 5/1241 180/297 |
| 7,445,076 | B2 * | 11/2008 | Shigematsu | B60K 5/1216 180/298 |
| 8,511,416 | B2 * | 8/2013 | Hiruma | B60K 1/00 180/291 |
| 2005/0079068 | A1 * | 4/2005 | Shigematsu | B60K 5/1216 417/363 |
| 2005/0211497 | A1 | 9/2005 | Racz et al. | |
| 2010/0101885 | A1 | 4/2010 | Nozaki et al. | |
| 2012/0255804 | A1 | 10/2012 | Akoum | |
| 2017/0036698 | A1 | 2/2017 | Hirano | |

FOREIGN PATENT DOCUMENTS

| | | |
|---|---|---|
| DE | 10241271 B4 | 9/2016 |
| DE | 102015225282 A1 | 6/2017 |
| DE | 102016103412 A1 | 8/2017 |
| WO | 2013071128 A2 | 5/2013 |

OTHER PUBLICATIONS

European Search Report for related case EP19158976.1, dated Jul. 25, 2019.

* cited by examiner

A-A

B-B

ARRANGEMENT FOR A DRIVE MOUNTING

The invention relates to an arrangement for a drive mounting, in particular for a motor vehicle, preferentially for a utility vehicle.

In the prior art, a multiplicity of drive mountings are known, which mount a drive unit of a motor vehicle on a vehicle frame of the motor vehicle.

DE 102 41 271 B4 discloses a drive module for a bus, having a drive unit comprising a motor and a transmission, a support frame for an ancillary unit and installation means for connecting the drive unit and the ancillary unit to the vehicle structure. A detached drive unit can be moved downwards away from the vehicle structure.

US 2005/0211497 A1 discloses a drive mounting for a vehicle having a rear motor, in particular a bus, in which the drive motor and the transmission are constructed with a single axle in order to form a rigid and stable unit. The transmission is installed in a structure of a rear motor bus. The transmission is embedded in a transmission support frame.

U.S. Pat. No. 4,362,221 discloses a wheel and motor support system. A motor support frame supports an internal combustion engine orientated in the vehicle transverse direction.

Known drive mountings are typically designed for mounting internal combustion engines and accordingly are adapted to the special requirements of these. The integration of electric drive units in motor vehicles, in particular in utility vehicles, can make other demands and open up possibilities. For example, there can be other requirements and possibilities in terms of the installation space, the assembly and/or the mounting characteristics.

The invention is based on the object of creating an alternative and/or improved arrangement for the drive mounting, in particular for a motor vehicle, preferentially for a utility vehicle. In particular, disadvantages from the prior art are to be overcome and/or an electric drive unit mounted.

The object is solved through the features according to independent claim 1. Advantageous further developments are stated in the dependent claims and the description.

The arrangement for the drive mounting is suitable in particular for a motor vehicle, preferentially for a utility vehicle (for example a rear wheel drive utility vehicle). The arrangement comprises a supporting structure, in particular a cross member structure. The arrangement comprises an, in particular electric, drive unit (e.g. comprising an electric motor and a transmission). The drive unit is (for example detachably or non-detachably) attached to the supporting structure (e.g. assembled fastened, suspended, mounted) in a 3-point mounting on an underside and/or from below (e.g. from the floor and/or from a floor side).

Advantageously, the drive unit can thus be fed to the motor vehicle from the rear end. The drive unit can be practically lifted in order to be then attached to the supporting structure on an underside or from below. This can be helpful for example when for a rear-end sliding-in with subsequent lowering of the drive unit on a support frame or a support plate there is not sufficient or hardly any space. The 3-point mounting makes possible a quick assembly. In addition, a static redundancy of the mounting through too many bearing points (e.g. four or more) is prevented.

Practically, the drive unit, except for the 3-point mounting, cannot otherwise be mounted on the vehicle frame.

In particular, the drive unit can only be mounted suspended and/or not be supported from a floor side of the drive unit.

Preferentially, the drive unit can only be attached from below and/or only on the underside of the supporting structure.

In a state detached from the supporting structure it is possible that the drive unit can be moved away downwards and/or moved away in the vehicle rear direction or vehicle frame rear direction (vehicle longitudinal direction).

It is also possible that the arrangement seen in a forward travelling direction of the motor vehicle is arranged behind a (driven) rear axle of the motor vehicle. Alternatively, the arrangement can, seen in a forward travelling direction of the motor vehicle, be arranged for example in front of a (driven) rear axle of the motor vehicle.

In a preferred exemplary embodiment, the arrangement comprises multiple bearing units, in particular exactly three bearing units. The multiple bearing units are attached to the supporting structure (e.g. on reinforcement elements in particular on an underside for example of cross members of the supporting structure) (e.g. assembled, fastened, suspended, mounted) on an underside and/or from below and support the drive unit.

For example, the exactly three bearing units can form the 3-point mounting.

In an exemplary embodiment, the multiple bearing units are pre-assembled on and/or attached to the drive unit, before the drive unit is attached to the supporting structure. Alternatively or additionally, the multiple bearing units and the drive unit form an assembly mounting unit for (e.g. uniform, joint and/or simultaneous) mounting to the supporting structure.

In a further exemplary embodiment, the multiple bearing units directly support the drive unit. Thus, no separate support frame or similar has to be provided for example.

In an embodiment, the multiple bearing units are (substantially) formed as identical parts. Thus, assembly errors can be prevented and costs saved.

In a further embodiment, the multiple bearing units are at least partly mounted to the supporting structure in different orientations. Alternatively or additionally, at least one bearing unit of the multiple bearing units is mounted standing upside down and/or inverted compared with at least one other one of the remaining bearing units. By way of this, it is possible to react to particular conditions of the installation space and/or for a mounting to be simplified.

In an embodiment version, a first bearing unit and a second bearing unit of the multiple bearing units are attached to an output side of the drive unit. In particular, these bearing units can support the moment output by the drive unit substantially for example by more than 90%. Alternatively or additionally, a third bearing unit of the multiple bearing units is attached on a side of the drive unit located opposite the output side.

In particular, the first bearing unit and/or the second bearing unit can be arranged located outside and/or in an upper region on the output side. By way of this, for example as large as possible a lever action for supporting the output torque of the drive unit can be achieved.

For example, the first bearing unit and/or the second bearing unit can be arranged on the drive motor of the drive unit and/or next to/located outside of the transmission of the drive unit. A diameter of the transmission can for example be smaller than a diameter of the drive unit so that, by way of this arrangement, installation space can be saved.

Practically, the third bearing unit can be centrally arranged on the side of the drive unit located opposite the output side, in particular on the drive motor of the drive unit.

It is possible that the third bearing unit compared with the second bearing unit and the first bearing unit quasi stands upside down or is inverted. This can facilitate the mounting.

In a further embodiment version, the multiple bearing units each comprise a support arm and/or at least one elastomer element.

It is also possible that the multiple elastomer elements of a bearing unit are connected to one another and/or are integrally formed in one piece.

Practically, the at least one elastomer element is braced in the installed state of the drive unit between the support arm and the supporting structure.

In a further development, the support arm is produced from a plastic, in particular a fibre-reinforced plastic, preferentially a glass fibre-reinforced plastic. Such a support arm can offer advantages in terms of weight and costs. Alternatively, the support arm can be produced for example from a metal, in particular as a metal casting, preferentially as an aluminium die casting. It is also possible to produce the support arm from a different material.

In an exemplary embodiment, the support arm is directly fastened to the drive unit (e.g. detachably, non-detachably, screwed, welded etc.). Practically, the at least one elastomer element can be directly fastened to the supporting structure (e.g. detachably, non-detachably, screwed, welded etc.).

Alternatively or additionally, the support arm comprises a mounting plate which is directly fastened to the drive unit (e.g. detachably, non-detachably, screwed, welded etc.), and/or an overhang, on which the at least one elastomer element is attached. For example, a first elastomer element and a second elastomer element can be arranged on opposite sides of an overhang of the support arm.

In a further exemplary embodiment, the at least one elastomer element is formed, in particular annularly, with a through-hole, in which a fastening element is received, which fastens the at least one elastomer element on the supporting structure, in particular in a braced manner. Alternatively or additionally, the multiple bearing units are each mounted to the supporting structure by means of merely one fastening element, in particular a screw.

In an embodiment, the drive unit is attached (e.g. assembled, fastened, suspended, mounted) to a region of the supporting structure that is bent upwards, curved upwards and/or arched upwards, in particular of a first cross member and/or of a second cross member of the supporting structure. The region bent, curved and/or arched upwards can create additional installation space for one or more bearing units and/or the drive unit.

In a further embodiment, the drive unit is mounted without inclination (i.e. 0° inclination). Alternatively, the drive unit is mounted inclined; the drive unit is mounted inclined relative to a horizontal plane of the supporting structure and/or of the motor vehicle and/or the drive unit is mounted inclined relative to a vertical longitudinal plane of the supporting structure and/or of the motor vehicle. The inclined mounting can make possible an easier connection to an axle flange which has a suitably inclined orientation.

In an embodiment version, the supporting structure comprises a first cross member and a second cross member and the drive unit is mounted in particular only to the first cross member and the second cross member. Alternatively or additionally, the drive unit is positioned substantially below the supporting structure (e.g. of a first cross member and of a second cross member of the supporting structure).

In a further embodiment version, the arrangement is embodied as a rear wheel drive standard mounting of a utility vehicle, in particular of a bus (e.g. city bus) or of a truck (e.g. distribution truck, city truck). Alternatively or additionally, the supporting structure forms a recess that is in particular accessible at the vehicle rear end in a vehicle frame for receiving the drive unit. By way of this, the drive unit can be fed in from the rear for the assembly.

Practically, the drive unit can be orientated in a longitudinal direction of a vehicle frame and/or of the motor vehicle.

The invention is also directed at a motor vehicle, in particular a utility vehicle (for example bus, in particular city bus or truck, in particular distribution trucks or city trucks) comprising the arrangement disclosed here.

It is also possible to use the device as disclosed here for passenger cars, large motors, off-road vehicles, stationary motors, marine motors etc.

The previously described embodiments and features of the invention can be combined with one another as desired. Further details and advantages of the invention are described in the following making reference to the attached drawings. There:

Figure 1:
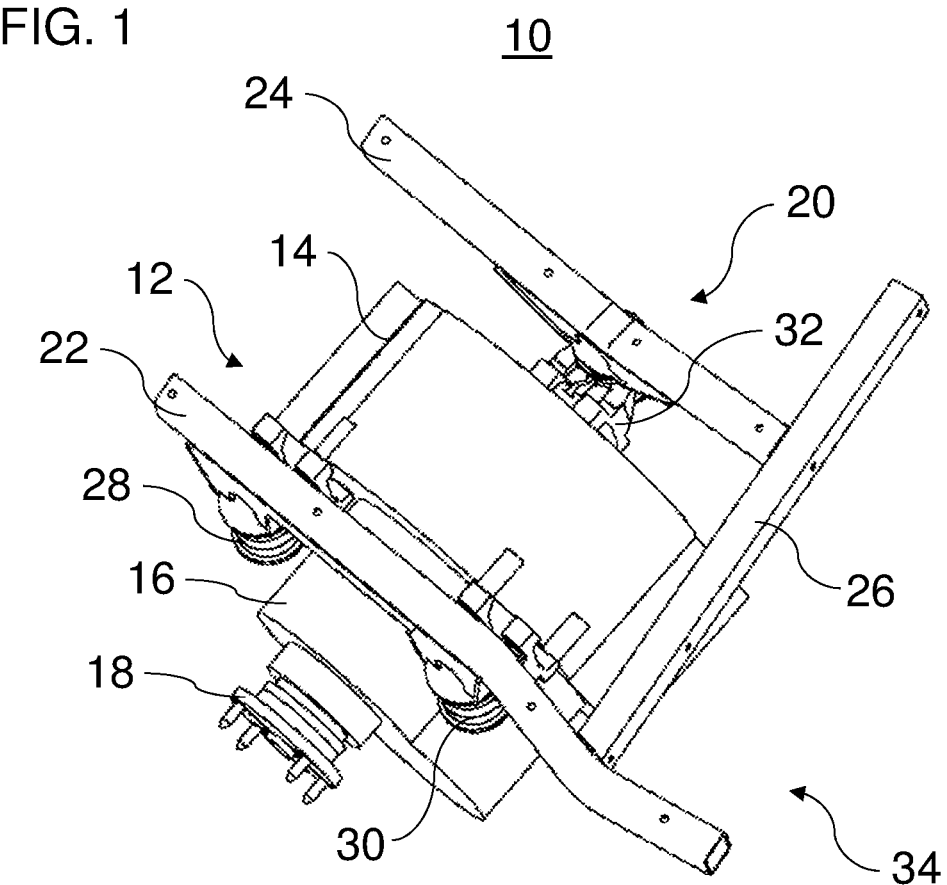
FIG. 1 shows a perspective view of an exemplary arrangement for mounting a drive unit according to the present disclosure.
Figure 2:
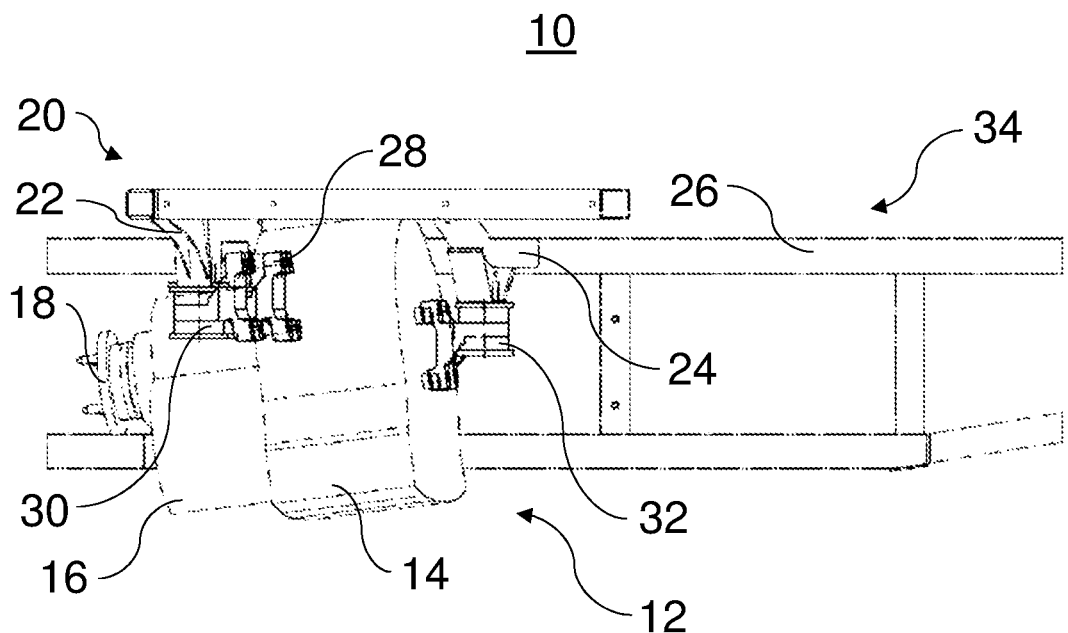
FIG. 2 shows a lateral view of the exemplary arrangement for mounting the drive unit, wherein the drive unit is shown transparently dashed.
Figure 3:
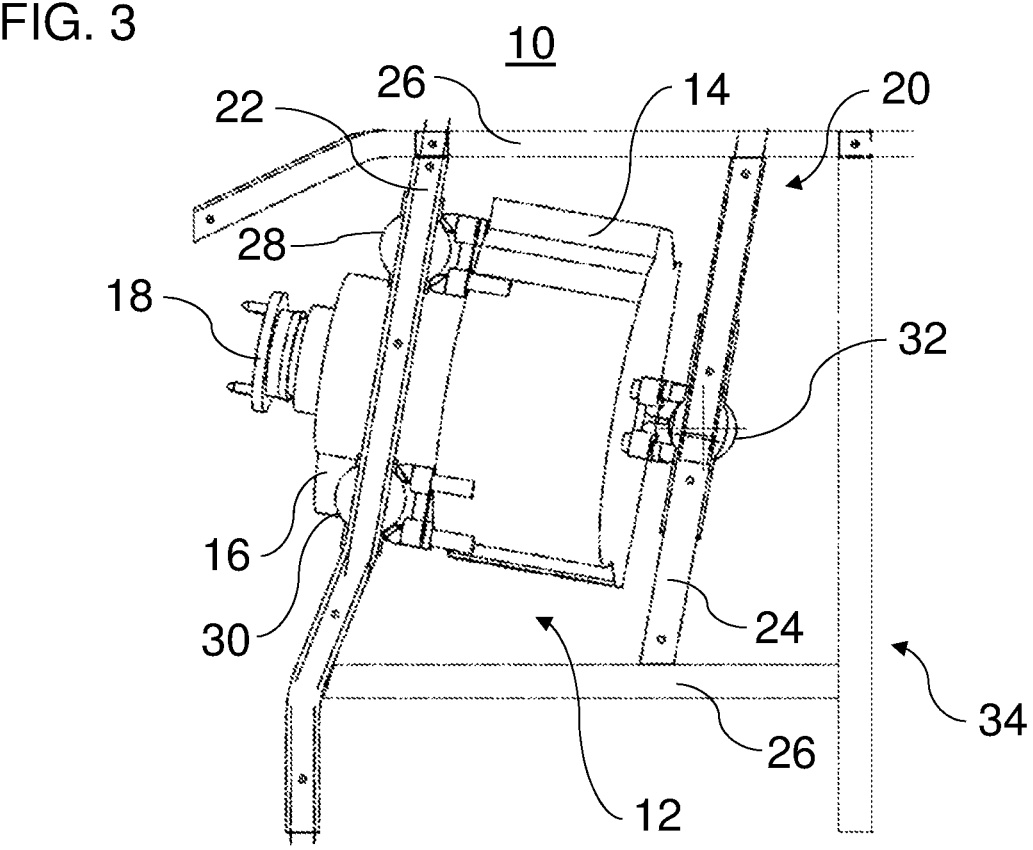
FIG. 3 shows a plan view of the exemplary arrangements for mounting the drive unit.
Figure 4:
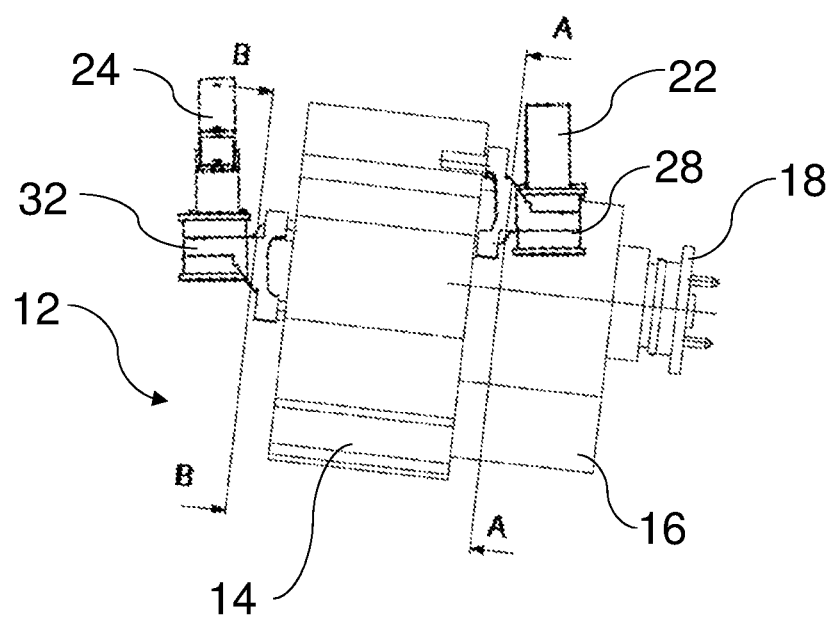
FIG. 4 shows a lateral view of bearing units and of the drive unit of the exemplary arrangement.
Figure 5:
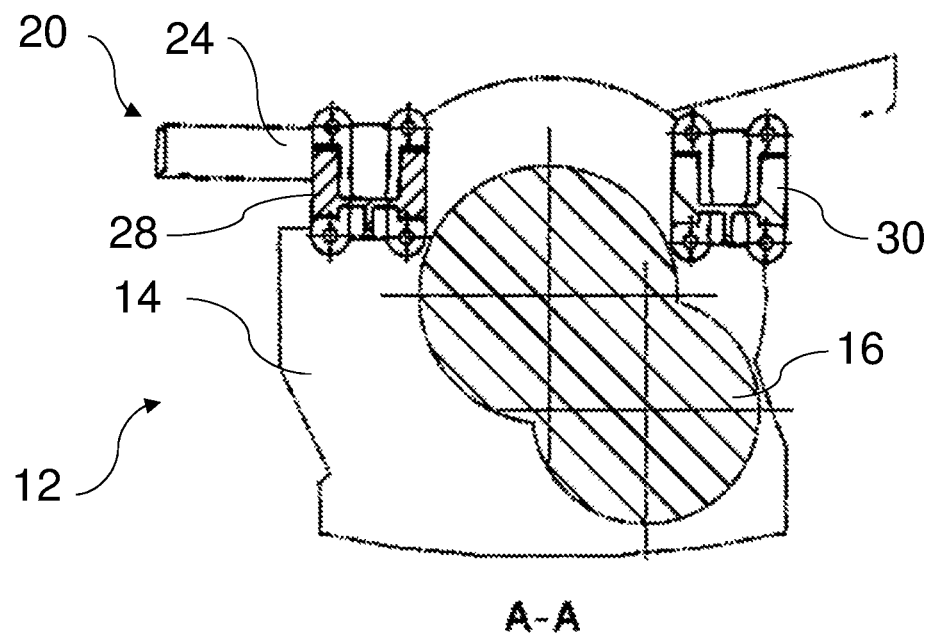
FIG. 5 shows a sectional view along a line A-A in FIG. 4.
Figure 6:
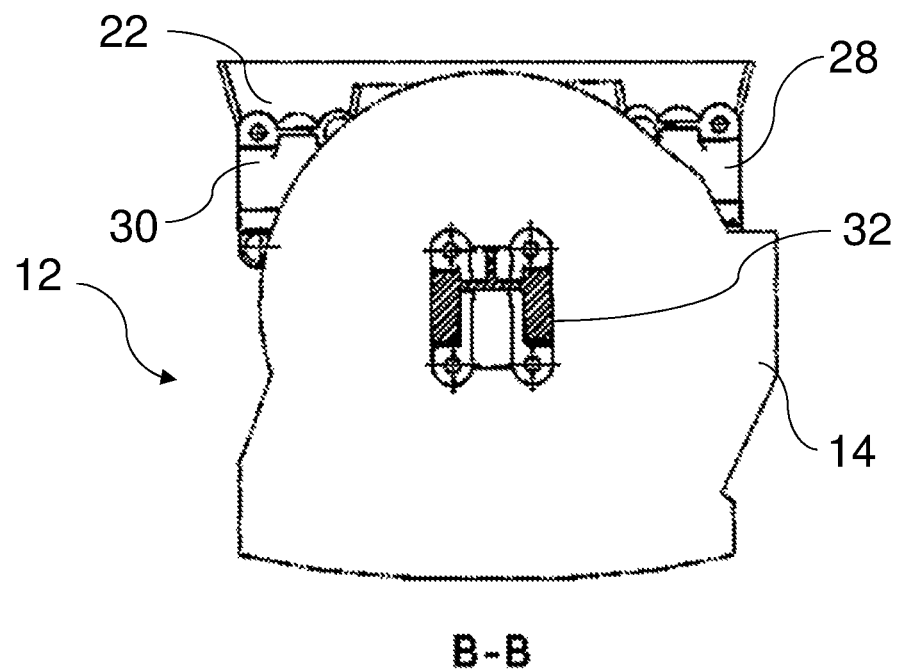
FIG. 6 shows a sectional view along a line B-B in FIG. 4.

FIGS. 1 to 3 show an arrangement 10 for mounting a drive unit 12. The arrangement 10 can be positioned in a motor vehicle seen in a forward travelling direction of the motor vehicle behind a driven rear axle. The arrangement 10 is formed as a rear wheel drive bearing unit in particular for a utility vehicle. The utility vehicle can for example be a bus, for example a city bus, or a truck, for example a city truck or a distribution truck. However it is also possible to use and/or otherwise position the arrangement 10 in other utility vehicles or motor vehicles.

In the following, the arrangement 10 is exemplarily described making reference to FIGS. 1 to 7.

The drive unit 12 can be formed in particular as an electric drive unit. The drive unit 12 comprises a drive motor 14, in particular an electric motor. The drive unit 12 can, furthermore, comprise a transmission 16 with an output element 18. The drive motor 14 is drive-connected to the transmission 16. The output element 18 can be drive-connected with a drive element or rear axle flange of a driven rear axle (not shown).

The drive unit 12 is mounted inclined on a supporting structure 20. The inclined mounting of the drive unit 12 can be matched to an orientation of a drive element or axle flange of a driven (rear) axle (not shown). Through the inclination of the drive unit 12, an orientation of the output element 18 can correspond to an orientation of the drive element of the driven axle (not shown), which are to be drive-connected with one another. In particular, the drive unit 12 can be inclined relative to a horizontal axis of a vehicle frame or chassis 34 of the motor vehicle, for example in a range between 0° and 10°. Furthermore, the drive unit 12 can be inclined relative to a vertical longitudinal plane of the motor vehicle, for example in a range between 0° and 15°. However it is also conceivable that the drive unit 12 is mounted without inclination.

The arrangement 10 comprises the supporting structure 20. The supporting structure 20 forms a part of the vehicle frame 34 of the motor vehicle. The supporting structure 20 is embodied as a cross member structure. The supporting structure 20 comprises a first cross member 22 and a second cross member 24. The cross members 22 and 24 are fastened between side members 26 of the vehicle frame 34. Seen in forward travelling direction of the motor vehicle, the first cross member 22 is arranged in front of the second cross member 24. In other exemplary embodiments, different arrangements in particular of the cross members are possible for example.

The first cross member 22 is arched upwards in the suspension region for the drive unit 12. By way of this, additional installation space for the drive unit 12 can be created. It is also possible that the second cross member 24 is formed arched, curved and/or bent upwards, in particular in the suspension region for the drive unit 12. In other embodiments, the first cross member and the second cross member can substantially extend linearly.

The supporting structure 20 supports the drive unit 12. Here, the drive unit 12 is attached suspended from the supporting structure 20 by means of multiple bearing units 28, 30, 32. Apart from the bearing units 28, 30, 32, the drive unit 12 is in particular not otherwise supported or propped up on the supporting structure 20. The drive unit 12 is mounted to the supporting structure 20 from below. In particular, the drive unit 12 is mounted to an underside of the supporting structure 20.

The drive unit 12 is substantially positioned below the supporting structure 20. The transmission 16 is directly positioned below the first cross member 22. The drive motor 14 is positioned between the cross members 22, 24 and substantially below the supporting structure 20.

In the shown embodiment, the drive unit 12 is mounted to an underside of the first cross member 22 by means of the first bearing unit 28 and the second bearing unit 30. By means of the third bearing unit 32, the drive unit 12 is mounted to an underside of the second cross member 24. Thus, the three bearing units 28, 30, 32 form a 3-point arrangement for mounting the drive unit 12. The first bearing unit 28 and the second bearing unit 30 are arranged on an output side or side of the output element 18 of the drive unit 12. The third bearing unit 32 is arranged on a side of the drive unit 12 located opposite the output side.

The bearing units 28, 30, 32 are directly attached to the drive unit 12 prior to its assembly on the supporting structure 20. The bearing units 28, 30, 32 can be detachably preassembled on the drive unit 12 for example by means of screw connection. Alternatively, the bearing units 28, 30, 32 can be non-detachably fastened to the drive unit 12 for example by means of welding. An assembly mounting unit consisting of the drive unit 12 and the bearing units 28, 30, 32 is mounted to the supporting structure 20 as a unit. For this purpose, the assembly mounting unit is moved under the supporting structure 20 from the back. The bearing units 28, 30, 32 are aligned on the cross members 22, 24 with corresponding fastening regions. The assembly mounting unit is lifted. The bearing units 28, 30, 32 are attached, in particular detachably attached, from below directly on an underside of the cross member 22, 24 of the supporting structure 20.

The bearing units 28, 30, 32 can be embodied as identical parts. For the sake of installation space and/or assembly, it can be advantageous to partly mount the bearing units 28, 30, 32 in different orientations. For example, the third bearing unit 32 in the shown embodiment is orientated standing upside down or inverted relative to the first and second bearing unit 28, 30. By using different orientations for the bearing units 28, 30, 32, the same can be more flexibly employed even when they are embodied as identical parts.

Figure 7:
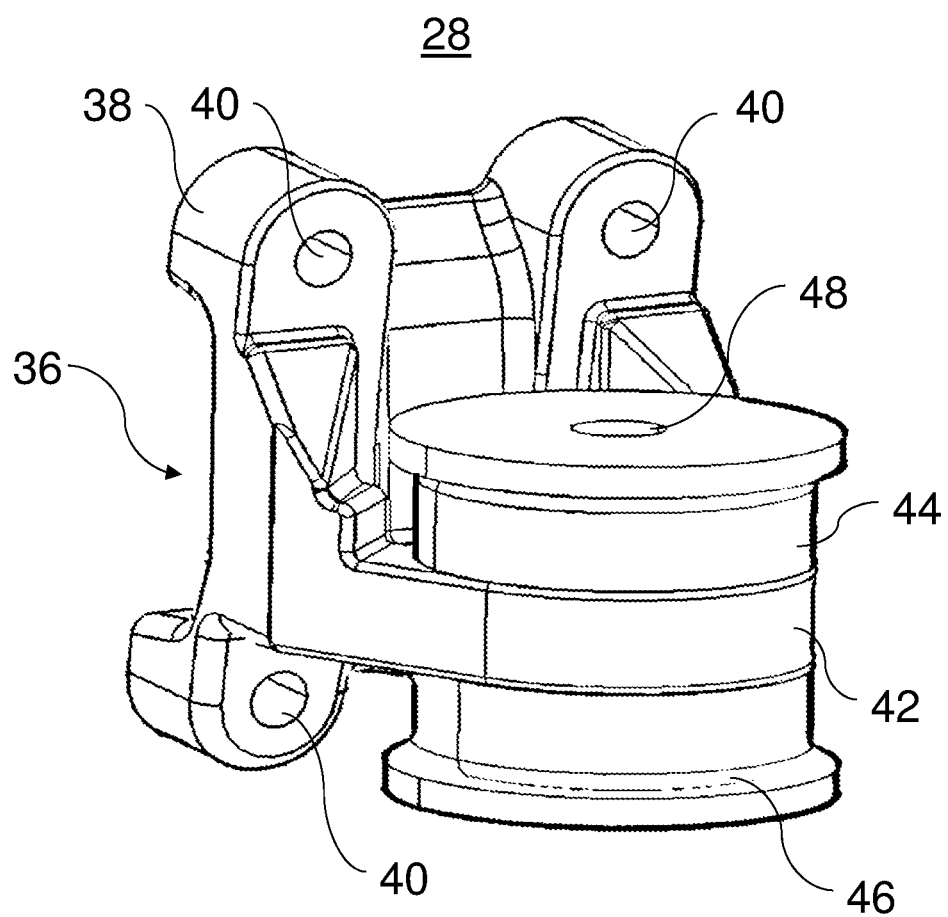
FIG. 7 shows a perspective view of a bearing unit of the exemplary arrangement for mounting of drive unit The embodiments shown in the figures correspond at least partly, so that similar or identical parts are provided with the same reference numbers and regarding the explanation of which reference is also made to the description of the other embodiments or figures in order to avoid repetitions.

FIG. 7 shows an exemplary embodiment of the first bearing unit 28. In exemplary embodiments, in which the bearing units 28, 30, 32 are embodied as identical parts, the following explanations thus also apply to the bearing units 30 and 32.

The first bearing unit 28 comprises a support arm 36. The support arm 36 comprises a mounting plate 38. The mounting plate 38 serves for fastening the first bearing unit 28 to the drive unit 12. The mounting plate 38 comprises at least one through-hole 40 for receiving fastening elements (not shown). The mounting plate 38 comprises for example four through-holes 40 which are arranged in corner regions of the mounting plate 38. For example, the support arm 36 can be fastened to the drive unit 12 by means of multiple screws which extend through the through-holes 40.

The support arm 36 has an overhang or a projection 42. The overhang 42 extends away from the mounting plate 38. The overhang 42 is arranged on a side of the mounting plate 38 facing away from the drive unit 12. The overhang 12 comprises a through-hole (not visible in FIG. 7), which extends in particular approximately in the vertical direction. It is also possible that the through-hole extends inclined relative to a vertical direction, in particular in an installation position.

The first bearing unit 28 comprises a first elastomer element 44 and a second elastomer element 46. The first bearing unit 28 is attached to the supporting structure 20 by means of the elastomer elements 44, 46. In an installation position, the elastomer elements 44, 46 can be preloaded. The preload can act in particular between the support arm 36 and the supporting structure 20. The preload also materializes through the interaction between the elastomer elements 44, 46 and the through-hole in the overhang 42.

The elastomer elements 44, 46 can be formed for example annularly, as shown. The elastomer elements 44, 46 can be produced for example from a rubber material. The elastomer element 44, 46 are arranged on opposite lateral faces of the overhang 42. The elastomer elements 44, 46 each have a through-hole 48. The through-holes 48 are aligned with the through-hole of the overhang 42. A detachable fastening element can be inserted from below through the first elastomer element 44, the overhang 42 and the second elastomer element 46 and attached to the supporting structure 20. The detachable fastening element can be for example a screw which is screwed into the cross member 22, 24 from below. When using the shown embodiment, only three screws are thus needed for attaching the assembly mounting unit consisting of drive unit 12 and bearing units 28, 30, 32 to the cross members 22, 24.

It is possible that the support arm 36, in particular the mounting plate 38 and the overhang 42, are produced from a plastic. For example, a fibre-reinforced plastic, in particular a glass fibre-reinforced plastic, can be used for producing the support arm 36. However, other materials are also conceivable. For example, the support arm 36 can be an aluminium casting, in particular an aluminium die casting.

Practically, the elastomer elements 44, 46 can be formed as identical parts.

Because of new requirements (drive versus recuperation) by the integration of electric drive units, the elastomer elements 44, 46 for example can also be formed as symmetrical.

The invention is not restricted to the preferred exemplary embodiments described above. On the contrary, a multiplicity of versions and modifications is possible which likewise make use of the inventive idea and are therefore included in the scope of protection. In particular, the invention also claims protection for the subject and the features of the subclaims independently of the claims referred to. In particular, the features of independent claim 1 are disclosed independently of one another. In addition, the features of the subclaims are also disclosed independent of all features of independent claim 1 and for example independent of the features with respect to the presence and/or the configuration of the supporting structure and/or the drive unit and/or the 3-point arrangement of independent claim 1.

LIST OF REFERENCE NUMBERS

10 Arrangement
12 Drive unit
14 Drive motor
16 Transmission
18 Output element
20 Supporting structure
22 First cross member
24 Second cross member
26 Side member
28 First bearing unit
30 Second bearing unit
32 Third bearing unit
34 Vehicle frame
36 Support arm
38 Mounting plate
40 Through-hole
42 Overhang
44 First elastomer element
46 Second elastomer element
48 Through-hole

The invention claimed is:

1. An arrangement for a drive mounting of a motor vehicle, comprising:
 a supporting structure;
 a drive unit attached to the supporting structure in a 3-point mounting on an underside of the supporting structure or from below the supporting structure; and
 multiple bearing units attached to the supporting structure on an underside or from below and which support the drive unit;
 wherein each of the multiple bearing units comprises a support arm, and the support arm is produced from a fibre-reinforced plastic or from a glass fibre-reinforced plastic.

2. The arrangement according to claim 1,
 wherein:
 the multiple bearing units are preassembled on or attached to the drive unit, before the drive unit is attached to the supporting structure, or
 the multiple bearing units and the drive unit form an assembly mounting unit for mounting to the supporting structure or the multiple bearing units directly support the drive unit.

3. The arrangement according to claim 2, wherein the multiple bearing units have substantially identical structures.

4. The arrangement according to claim 1,
 wherein:
 the multiple bearing units are at least partly mounted to the supporting structure in different orientations; or
 at least one bearing unit of the multiple bearing units is mounted standing upside down or inverted compared with at least one other of the multiple bearing units.

5. An arrangement for a drive mounting of a motor vehicle, comprising:
 a supporting structure; and
 a drive unit attached to the supporting structure in a 3-point mounting on an underside of the supporting structure or from below the supporting structure; and
 multiple bearing units attached to the supporting structure on an underside or from below and which support the drive unit;
 wherein a first bearing unit and a second bearing unit of the multiple bearing units are attached to an output side of the drive unit; and
 a third bearing unit of the multiple bearing units is attached on a side of the drive unit located opposite the output side.

6. The arrangement according to claim 5,
 wherein:
 each of the multiple bearing units comprises at least one of the group consisting of a support arm and at least one elastomer element.

7. The arrangement according to claim 6, wherein:
 at least one of the multiple bearing elements comprises a support arm produced from a fibre-reinforced plastic or from a glass fibre-reinforced plastic.

8. The arrangement according to claim 6, wherein:
 at least one of the multiple bearing elements comprises a support arm produced from a metal or as a metal casting or as an aluminium die casting.

9. The arrangement according to claim 6, wherein:
 the support arm is directly fastened to the drive unit; or
 the at least one elastomer element is directly fastened to the supporting structure; or
 the support arm comprises a mounting plate, which is directly fastened to the drive unit; or
 the support arm comprises an overhang, on which the at least one elastomer element is attached; or
 a first elastomer element and a second elastomer element are arranged on opposite sides of an overhang of the support arm.

10. An arrangement for a drive mounting of a motor vehicle, comprising:
 a supporting structure; and
 a drive unit attached to the supporting structure in a 3-point mounting on an underside of the supporting structure or from below the supporting structure; and
 multiple bearing units attached to the supporting structure on an underside or from below and which support the drive unit;
 wherein each of the multiple bearing units comprises at least one of the group consisting of a support arm and at least one elastomer element, the at least one elastomer element is formed with a through-hole configured to receive a fastening element, which fastens the at least one elastomer element to the supporting structure in a braced manner.

11. The arrangement according to claim 1, wherein:
the drive unit is attached to a bent upwards, curved upwards or arched upwards region of a first cross member or of a second cross member of the supporting structure.

12. The arrangement according to claim 1, wherein:
the drive unit is mounted without inclination; or
the drive unit is mounted inclined; or
the drive unit is mounted inclined relative to a horizontal plane of the supporting structure or of the motor vehicle; or
the drive unit is mounted inclined relative to a vertical longitudinal plane of the supporting structure or of the motor vehicle.

13. The arrangement according to claim 1, wherein:
the supporting structure comprises a first cross member and a second cross member and the drive unit is mounted only to the first cross member and the second cross member; or
the drive unit is positioned substantially below the supporting structure.

14. The arrangement according to claim 1, wherein:
the arrangement is embodied as a rear wheel drive standard mounting of a bus or of a truck; or
the supporting structure forms a recess that is accessible at the vehicle rear end in a vehicle frame for receiving the drive unit; or
the drive unit is orientated in a longitudinal direction of a vehicle frame or of the motor vehicle.

15. A utility vehicle, comprising an arrangement for a drive mounting, the arrangement comprising:
a supporting structure;
a drive unit, which is attached to the supporting structure in a 3-point mounting on an underside of the supporting structure or from below the supporting structure; and
multiple bearing units attached to the supporting structure on an underside or from below and which support the drive unit;
wherein each of the multiple bearing units comprises a support arm, and the support arm is produced from a fibre-reinforced plastic or from a glass fibre-reinforced plastic.

16. The arrangement according to claim 15, wherein:
the multiple bearing units comprise three bearing units.

17. The arrangement according to claim 1, wherein the supporting structure comprises a cross member structure.

18. The arrangement according to claim 17, wherein the drive unit comprises an electric drive unit.

19. The arrangement according to claim 1, wherein the drive unit comprises an electric drive unit.

* * * * *